U.S. Patent Office
3,084,048
Patented Apr. 2, 1963

3,084,048
METHODS FOR PRODUCING BAKED GOODS
Herbert O. Renner, 332 N. Wolf Road, Des Plaines, Ill.
No Drawing. Filed June 23, 1959, Ser. No. 15,782
(Filed under Rule 47(b) and 35 U.S.C. 118)
9 Claims. (Cl. 99—90)

This invention relates to methods for preparing yeast-leavened baked goods and to compositions for use therein. The invention has particular utility in the preparation of white bread and rolls.

In the baking art, it has long been common practice to employ as additives in the dough mixture various agents intended to provide specific improvements in the finished product. Thus, calcium peroxide has been employed to provide an increase in water absorption while maintaining satisfactory dough properties and avoiding deleterious volume changes in the finished product, and the bromates have been employed to provide a dough-maturing action evidenced by improvement in grain, texture and volume of the finished bread or other baked goods. Considering these agents which heretofore have proved suitable for commercial use, the action of each agent is more or less specific, and the baker has been forced to use more than one additive when a variety of improving actions is desired. Thus, for instance, if both a dough-maturing effect and an increase in water absorption are desired, it has heretofore been necessary to add to the dough mixture both a bromate or like maturing agent and calcium peroxide. Further, save for the legume enzyme materials, no commercially satisfactory additive has been available which is capable of accomplishing dough bleaching or otherwise improving crumb color of the baked goods by action in the dough or during baking.

The present invention provides an improved method for preparing baked goods employing, as additives in the dough mixture, certain novel oxidatively active compositions derived from acetone and hydrogen peroxide. All embodiments of the invention provide improved dough properties and allow increased water absorption without deleterious volume changes in the finished product. Preferred embodiments of the invention also provide a marked dough-maturing effect evidenced by improved volume and internal characteristics, particularly the grain and texture, of the finished baked goods. Additionally, certain embodiments of the invention accomplish improvement in the crumb color of the finished bread or the like.

As has been indicated, the present invention is based upon the use of certain oxidatively active reaction mixtures derived from acetone and hydrogen peroxide. In this specification, I employ the term "oxidatively active" to designate the ability of the composition to at least mature flour when blended therewith in proportions providing a hydrogen peroxide equivalent on the order of 0.001% of the weight of the flour.

The oxidatively active compositions employed in the present invention comprise reaction product mixtures derived from acetone and hydrogen peroxide, the reaction product mixtures being useful per se, or combined with certain particulate solid materials as hereinafter described in detail. The reaction product mixtures are obtained by aging mixtures of acetone and hydrogen peroxide for a length of time which varies inversely as the temperature and the amount and activity of the catalyst, if a catalyst be employed. The speed and extent of the reaction is also dependent upon the concentration of hydrogen peroxide, both in the aqueous solution thereof initially employed and in the total reaction mixture. Employing 35% aqueous hydrogen peroxide with approximately molar proportions of acetone and hydrogen peroxide, with no catalyst and using a minimum temperature of about 4° C., the reaction proceeds very slowly and the time period can be as long as many weeks. Using a maximum of about 2% by weight of an acid catalyst and an elevated temperature not above the boiling point of the reaction mixture, usually below 100° C., the reaction period is shortened to as little as a few seconds, depending upon the temperature and the effectiveness of the catalyst. Using molar proportions of acetone and 35% aqueous hydrogen peroxide, the ranges of variables are as follows:

| Temperature (° C.) | Catalyst (percent by weight) | Time |
|---|---|---|
| 4 | None | 2–50 weeks. |
| 4 | 0.1 (phosphoric acid) | 24 hours–2 weeks. |
| Room | None | 1–2 weeks. |
| Do | 1.0 (weak acid) | ½–12 hours. |
| Do | 1.0 (phosphoric acid) | 30–90 minutes. |
| Do | 1.0 (hydrochloric acid) | 10–30 minutes. |
| Boiling point | None | 30 minutes–several hours. |
| Do | 0.1 (phosphoric acid) | Several minutes. |
| Do | 2.0 (phosphoric acid) | Several seconds. |

Compositions prepared by aging acetone-hydrogen peroxide mixtures in the manner just described can be characterized as (1) exhibiting oxidative activity as hereinbefore defined, (2) having a substantial titratable peroxide content afforded by acetone peroxides other than cyclic acetone peroxide polymers, (3) being substantially free from crystallized cyclic acetone peroxide polymers, and (4) containing a material proportion of bis(1,1'-hydroperoxy 1,1'-methyl) diethyl peroxide:

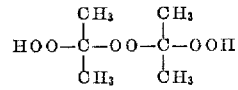

Such compositions also may contain material amounts of unreacted acetone and hydrogen peroxide, which unreacted compounds can be partially or substantially completely removed.

Bis-(1,1'-hydroperoxy 1,1'-methyl) diethyl peroxide is, by itself, an effective and valuable additive and its incorporation in dough mixtures in the preparation of baked goods is an important aspect of the invention. However, the reaction product mixtures involved in the present invention contain other acetone peroxides which contribute to the effectiveness of my method, one such compound being the corresponding dihydroperoxy trimer:

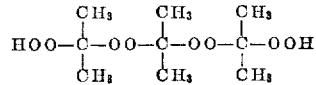

By analytical procedures described in my aforementioned copending application Serial No. 15,783, filed June 23, 1959, it can be shown that the reaction product mixtures produced under the conditions hereinbefore defined always contain a material proportion, varying from a few percent to a maximum of about 25% by weight of the total titratable peroxide content of the reaction mixture, of bis-(1,1'-hydroperoxy 1,1'-methyl) diethyl peroxide, the amount of such compound present depending upon the reaction or aging time, temperature and catalyst properties and strength. Of the remaining titratable peroxide content of the reaction mixture, a substantial proportion, usually not more than 10%, is provided by free hydrogen peroxide. The major proportion of such remainder, however, is provided by acetone peroxides, primarily hydroperoxidic, as yet unidentified, such products amounting to as much as 65% by weight of the total titratable peroxide content of the reaction mixture.

Advantageously, the reaction product mixtures hereinbefore defined are combined with a solid particulate material. Thus, the liquid reaction mixture can be fully aged to provide a solution of the desired reaction products, and this solution can then be combined with the solid material. Alternatively, part or all of the aging of the acetone-hydrogen peroxide reaction mixture can be accomplished on the solid particulate material, the reaction products then being formed directly on or in particles of the carrier material.

The relative proportions of acetone and hydrogen peroxide employed in preparing my compositions are selected from the weight-ratio range of from about 100:1 to about 1:20.

The aging catalysts suitable for use in preparing the oxidatively active compositions of my invention are the edible acid catalysts having a dissociation constant of at least about $6 \times 10^{-10}$. Of such catalysts, I find that the strong mineral acids are markedly superior, phosphoric acid and hydrochloric acid being particularly advantageous for many embodiments of the invention.

In this connection, it is to be noted that hydrogen peroxide in aqueous solution seems to dissociate to form hydrogen ions and that commercial grades of both acetone and hydrogen peroxide frequently contain small proportions of acid. Depending upon the aging conditions selected, such acid content can be effective to satisfactorily promote aging without further catalyst addition.

Typical acid catalysts suitable for the invention, besides hydrochloric, phosphoric, sulfuric and nitric acid, include iodic acid, bromic acid, pyrophosphoric acid, acetic acid, boric acid, lactic acid, and pyruvic acid. Acid salts, such as sodium acidpyrophosphate, for example, are suitable.

Where iodic or bromic acid is to be used as the aging catalyst, the acid may be produced directly in the liquid system by adding elemental iodine or bromine to the liquid so that the iodine or bromine is oxidized by the hydrogen peroxide. In this connection, it is to be noted that both iodine and bromine are readily soluble in acetone.

The more strongly ionized acids, such as the mineral acids, have a greater catalytic effect in bringing about the desired state of oxidative activity in my compositions than do the weakly ionized acids, such as boric acid. It is accordingly possible to pre-select the aging time and temperature by choice of the acid catalyst and its concentration. Thus, in a process for continuously producing oxidatively active compositions in accordance with the invention, where aging is desirably effected quickly, I may use a relatively large proportion of a relatively strongly ionized acid. On the other hand, if the particular commercial situation involved allows slow aging, I may employ a more weakly ionized acid or, in some instances, no catalyst at all.

The catalysts may be employed in proportions in the range of 0–2% by weight of the reaction mixture.

The acid catalysts have been referred to as edible and, in this connection, it will be understood that only the relatively minute quantities of catalyst employed are considered in dealing with the question of edibility. Thus, all of the strong mineral acids, for example, are edible in small quantity. The acid catalyst employed need not be permanently incorporated in the acetone-hydrogen peroxide system, it being sufficient if the catalyst and the system be maintained in intimate contact during the aging period.

The purpose of the acid catalysts is to effect a more rapid aging of the reaction system, while precluding, or at least greatly minimizing, the tendency to form crystallized acetone peroxide polymers, and the tendency toward side reactions which would consume hydrogen peroxide without producing any product capable of bringing about a desired oxidative change in organic food materials. Thus, a primary attainment of the process of my invention is to age without converting the hydrogen peroxide to ineffective compounds. In this regard, the aging conditions of time, temperature and acid proportion hereinbefore recited are of particular importance.

While, in some procedures for producing the oxidatively active compositions of the invention, it is advantageous to incorporate the acid catalyst in the initial liquid system, other procedures involve addition of all or a part of the catalyst after some aging has been accomplished. Thus, the acetone-hydrogen peroxide mixture can be initially aged by heat alone, or even by storage at room temperature, and a proportion of acid catalyst then added, at the time the composition is to be used, to complete the aging procedure. Similarly, a portion of the catalyst may be added initially, the remainder being added toward the end of the aging period. In such procedures, the first proportion of catalyst may advantageously consist of one acid, and the second proportion of a different one.

I find that, while those edible acid catalysts having a dissociation constant of at least $6 \times 10^{-10}$ are useful in preparing compositions for use in the invention, certain of such catalysts are individualistic in their effect. Thus, the mineral acids are distinctly more effective. Phosphoric acid and hydrochloric acid are more desirable than sulfuric acid and nitric acid, and phosphoric acid is superior as a catalyst for inclusion in the initial reaction mixture, while hydrochloric acid is superior for subsequent addition.

When the method of this invention is carried out with compositions comprising a solid particulate material, such composition can be of three types. The first type is one in which the reaction product mixture is primarily merely physically supported, as by simple absorption, adsorption and/or capillary force, on the solid material, in which case the solid material acts simply as a carrier. Such compositions are capable of freely emitting oxidatively active vapors, other than those of hydrogen peroxide, even at room temperature. The second type of composition is one in which the reaction product mixture is retained by the solid material not only in such manner as to allow escape of oxidatively active vapors but also in such fashion that a material proportion of the reaction products is so tightly bound by the solid material as to be released only on contact with water, as during mixing of the dough being treated, or in contact with water while at elevated temperature, as during baking of the dough. The third type of composition is one in which substantially all of the oxidatively active reaction products are so tightly bound by the solid material as to be released only upon contact with water, or with water and heat.

Compositions of the first type can be prepared with any solid, particulate, edible carrier material suitable for inclusion in yeast-leavened doughs, and require only that the liquid solution of the peroxidic reaction products be uniformly distributed on the solid, particulate material. Typical carriers which can be employed in this type of composition are the starches, cereal flours, calcium sulfate semihydrate and the edible neutral or acid phosphates.

Compositions of the second and third types can be prepared with starch, heat-modified starch or dextrin as the particulate solid material. With such solid materials, the method of preparation described in detail in my copending application Serial No. 15,780, filed June 23, 1959, now abandoned, can be employed. Thus, for example, the acetone-hydrogen peroxide liquid system, either aged, partially aged or freshly mixed, can be combined with starch or dextrin in proportions to provide a paste and the paste then dried and disintegrated to provide the final product. Even if the acetone-hydrogen peroxide mixture is not aged before application to the starch, the drying procedure will be effective to provide oxidative activity and a relatively stable composition, capable of releasing its oxidative activity upon contact with moisture or moisture and heat, will result. Similarly, smaller proportions of the liquid reaction system can be combined with the starch or dextrin and the resulting mixture than subjected to a heating step, with or without aeration to remove volatiles, at a temperature not exceeding 125° C.

Compositions of the second and third type can also be prepared with a proteinaceous vegetable material, or with an isolated vegetable portein, as the particulate solid material. Thus, wheat gluten and various soybean protein preparations are suitable. Using such proteinaceous materials, the liquid acetone-hydrogen peroxide system is worked uniformly into the proteinaceous material and the resulting product is subdivided at a temperature not exceeding 125° C., providing final compositions in which the oxidatively active components are retained within each particle of the protein by the hardened surface provided on the particle by the drying step. Again, the liquid system can be either freshly mixed, partially aged or fully aged when applied to the protein.

Depending upon the concentration of the dissolved peroxidic reaction products in the liquid reaction system, and upon the relative proportions of the liquid and solid materials, final compositions varying from less than 1% to as much as 15% by weight hydrogen peroxide equivalent can be prepared. Such compositions are then employed in preparing yeast-leavened doughs, the oxidatively active composition being added initially in the case of a straight dough procedure or in the dough-mixing stage, or the sponge stage, in the case of a sponge-dough procedure. The novel compositions of the invention are employed in proportions providing, in the dough, a hydrogen peroxide equivalent content on the order of a few thousands of a percent, for example, of the weight of flour employed in making the dough.

The following examples are illustrative of the invention:

*Example 1*

An initial reaction mixture was prepared by blending 46.5 ml. acetone and 53.5 ml. aqueous hydrogen peroxide solution (35% $H_2O_2$). The resulting blend was refluxed for 30 minutes over a boiling water bath, yielding a clear solution, completely free of crystalline products, exhibiting a horseradish-like odor characteristic of bis-(1,1'-hydroperoxy 1,1'-methyl) diethyl peroxide. The entire liquid reaction mixture was then blended uniformly with 147 g. of food grade corn starch which had previously been dried to reduce the moisture content thereof to less than 3% by weight. The resulting compositibon was then placed in a desiccator equipped with a Bunsen valve attachment and heated for 30 minutes over a boiling water bath without stirring. At the end of this period the product was removed from the desiccator, combined with an additional 850 g. of food grade corn starch and hammer-milled to uniform fine particle size. One hundred and fifty g. of the hammermilled product was blended uniformly with 150 g. of food grade corn starch, comprising a finished product, hereinafter referred to as the peroxidic composition of this example, having a hydrogen peroxide equivalent content of 0.91% by weight.

Employing a conventional sponge-dough procedure, and using a standard unbleached bread wheat flour (Liberty Special), a test bake was carried out to determine the dough maturing and bread improver activity of such composition. Three doughs were prepared, dough A being a control with no special additive, dough B containing 0.25% by weight, based on the flour, of a conventional calcium peroxide bread improver analyzing 0.65% by weight calcium peroxide, and dough C containing 0.2% by weight, based on the flour, of the peroxidic composition of this example. The calcium peroxide composition and the peroxidic composition of this example were added in the dough mixing stage. The basic formula employed in preparing the doughs was as follows:

| Ingredient | Sponge | Dough |
|---|---|---|
| Flour | 450.0 g | 250.0 g. |
| Water | 275.0 cc. (all doughs) | (Dough A) 130.0 cc. (Doughs B and C) 144.0 cc.¹ |
| Yeast | 17.5 g | |
| Yeast food | 2.0 g | |
| Milk solids | | 21.0 g. |
| Salt | | 14.0 g. |
| Sugar | | 35.0 g. |
| Lard | | 21.0 g. |

¹ Representing 2% additional water as compared to control dough A.

Doughs B and C were alike, firm and of good consistency, while dough A was more extensible.

Loaves of bread were baked from the three doughs under identical, conventional conditions. All loaves had normal volumes, showing that the conventional calcium peroxide, in dough B, and the special peroxidic composition of this example, in dough C, provided the 2% increase in water absorption without significant loaf volume change. The loaf prepared from dough C, including the special peroxidic composition of this example, showed definitely superior grain and texture as compared to the loaf from dough B. The scorers concluded that, on the basis of the comparison between the loaves from doughs B and C, the special peroxidic composition of this example was superior to calcium peroxide as a bread improver.

*Example 2*

An initial reaction mixture was prepared by blending 43 ml. acetone and 57 ml. aqueous hydrogen peroxide solution (35% $H_2O_2$) and this mixture was aged by refluxing for 30 minutes over a boiling water bath, yielding a clear solution entirely free from crystalline products and exhibiting a horseradish-like odor characteristic of bis-(1,1'-hydroperoxy 1,1'-methyl) diethyl peroxide. Two separate compositions were prepared, each by blending 15 ml. of the heat aged liquid mixture with 300 g. food grade corn starch, using a laboratory bowl mixer with a wire whip.

One such composition, hereinafter referred to as composition I, was employed in the baking test set out below without further treatment. The other such composition, hereinafter referred to as composition II, was heated over a boiling water bath for 40 minutes with suction applied to remove volatiles, the product then being hammermilled to uniform particle size. In its final form, composition II had a hydrogen peroxide content of 0.71% by weight.

Following a conventional sponge dough procedure, and using a commercially available bleached bread wheat flour (Liberty Special), a test bake was carried out to determine the dough maturing and bread improver effects of compositions I and II. Dough A was prepared, as a control, with no special additive. Dough B was prepared with 0.25% by weight, based on the flour, of a conventional calcium peroxide bread improver composition analyzing 0.65%, by weight, calcium peroxide. Dough C was prepared with 0.25 g. of composition I, incorporating in the dough a hydrogen peroxide equivalent content of approximately .002% by weight, based on the flour. Dough D was prepared with 0.25% by weight, based on the flour, of composition II. The basic formula employed in preparing the doughs was as follows:

| Ingredient | Sponge | Dough |
|---|---|---|
| Flour | 450.0 g | 250.0 g. |
| Water | 275.0 cc. (all doughs) | (Dough A) 140.0 cc. (Doughs B, C and D) 160.0 cc.¹ |
| Yeast | 17.5 g | |
| Yeast food | 2.3 g | |
| Milk solids | | 21.0 g. |
| Salt | | 14.0 g. |
| Sugar | | 35.0 g. |
| Lard | | 21.0 g. |

¹ Representing 3% additional water as compared to control dough A.

Doughs B, C and D were all of slightly soft consistency and had good dough handling properties at the pan, dough C being somewhat superior as to dough handling properties, even as compared to the control dough.

Loaves of bread were baked from the three doughs under identical conventional conditions. All of the loaves had very good volumes, demonstrating that the conventional calcium peroxide composition and compositions I and II of this example provided the necessary 3% increase in water absorption without significant loaf volume change. Grain and texture of the loaves from doughs A–D were scored as follows:

|  | Bread from dough | | | |
| --- | --- | --- | --- | --- |
|  | A | B | C | D |
| Grain (10) | 8.0 | 8.0 | 8.5 | 8.0 |
| Texture (15) | 13.0 | 13.0 | 13.5 | 13.0 |

From this score, it is obvious that, as a dough maturing and bread improver agent, composition I of this example was markedly superior to conventionally employed calcium peroxide, while composition II of this example was fully equivalent to conventionally employed calcium peroxide.

Example 3

Using the same flour, dough formula and pocedure as in Example 2, a test bake was carried out to compare the effectiveness of calcium peroxide and composition I of Example 2 for purposes other than increasing water absorption. A control dough A was made with no special additive. Dough B was prepared with the addition, at the dough mixing stage, of 0.25% by weight, based on the flour, of a conventional calcium peroxide bread improver composition analyzing 0.65% by weight calcium peroxide. Dough C was made with 0.25 g. of composition I of Example 2 added in the dough mixing stage. The amount of water added in the dough mixing stage was 140 cc. for each dough.

All three doughs were of equally good consistency. As to dough handling properties, however, dough C was found to be far superior to doughs A and B.

Bread was baked from the three doughs under identical conventional conditions. The loaves from all three doughs showed very good volume. Grain, texture and crumb color were scored as follows:

|  | Bread from dough | | |
| --- | --- | --- | --- |
|  | A | B | C |
| Grain (10) | 8.0 | 8.5 | 9.5 |
| Texture (15) | 13.0 | 13.5 | 15.0 |
| Crumb Color (10) | 7.5 | 7.5 | 9.0 |

It is thus apparent that, when the peroxidic compositions of my invention are prepared as was composition I of Example 2, without heating of the starch-reaction product mixture composition, such compositions are capable of effecting improvements in grain and texture superior to the results obtainable with calcium peroxide and, in addition, are effective to accomplish a marked color improvement, a purpose for which other agents, save enzymatically active legume materials, are practically useless.

Example 4

An initial reaction mixture was prepared by blending 43 ml. acetone and 57 ml. aqueous hydrogen peroxide solution (35% $H_2O_2$). The mixture was aged by refluxing for 30 minutes over a boiling water bath, the heat-aged product being a clear solution, free from precipitated products, and having the characteristic horseradish-like odor of bis-(1,1'-hydroperoxy 1,1'-methyl) diethyl peroxide. One hundred ml. of the heat-aged liquid was blended with 1000 g. of food grade corn starch and the resulting composition heated in a 1-gallon metal container equipped with a Bunsen valve, heating being carried out for 1 hour over a boiling water bath with occasional agitation. The product was then blended with an additional 500 g. food grade corn starch and hammermilled to uniform fine particle size. The final composition had a hydrogen peroxide equivalent content of 1.1% by weight.

Using the same formula and sponge-dough procedure as in Example 2, and employing a commercial, bleached, bread wheat flour (Daddy Dollar), a test bake was carried out with the composition to compare its effectiveness as a bread improver to that of calcium peroxide. Dough A was prepared as a control, with no special additive. Dough B was prepared with the addition in the dough mixing stage, of 0.25% by weight, based on the flour, of a conventional calcium peroxide composition analyzing 0.65% by weight calcium peroxide, an additional 2% water, as compared to the control, being used in the dough mixing stage. Dough C was prepared with the addition in the dough mixing stage of 0.167% by weight, based on the flour, of the novel peroxidic composition of this example, and an additional 3% water, as compared to the control.

Dough B was slack, doughs A and C of good consistency.

Bread was baked from the three doughs under identical conventional conditions. All loaves had good volumes. As to internal characteristics, however, the loaves from dough B were inferior to those from control dough A, while the loaves from dough C, made with the novel peroxidic composition of this example, were superior to those from control dough A. Thus, 0.167% of the novel composition of this example allowed more water absorption, yet gave superior internal loaf characteristics, than did 0.25% of the calcium peroxide composition.

Example 5

A stiff paste is prepared by working together in a mortar 50 g. white potato dextrin, 24 cc. aqueous hydrogen peroxide solution (30% $H_2O_2$), 5 cc. water, 1 cc. acetone and 1 drop of concentrated hydrochloric acid. The resulting paste was spread in thin layers on glass plates and exposed to acetone vapors in a closed container for 16 hours. After 2 hours of such exposure, the material was found to have changed to fondant-like consistency, to have a sweetish taste, indicating saccharification of the dextrin, and to have the pronounced horseradish-like odor characteristic of bis-(1,1'-hydroperoxy 1,1'-methyl) diethyl peroxide. At the end of the 16-hour treatment, the product was dried in open air at room temperature, ground to pass a 40-mesh screen, repeatedly washed with ethyl ether to remove free hydrogen peroxide, and dried in vacuo. The final product was dry, had a slightly sweetish taste, was strongly positive to potassium iodide, and gave immediate positive reaction with titanium dioxide. One gram of this product was blended with 99 g. of dry, food grade corn starch, as an extender, to provide a composition for use in test baking.

A test bake was carried out, preparing white bread by a conventional straight dough procedure, using an unbleached bread wheat flour and incorporating the composition of this example, in an amount equal to 0.05% of the weight of flour employed, by mixing the composition with the flour just before preparing the dough. As compared to a control with no special additive, the peroxidic composition of this example provided an increase in water absorption of 4.5%, without adversely affecting the volume of the baked loaves. No color improvement was noted. The dough prepared with the special composition of this example was more springy and elastic than the control. The baked loaves of bread from the dough containing the special composition showed a finer grain and a silkier texture than the control loaves. Thus, in addition to providing increased water absorption, the peroxidic composition of this example serves as an effective dough maturing agent.

This example demonstrates the suitability of white potato dextrin as a carrier with which the acetone-hydrogen peroxide reaction product mixture can be combined advantageously. The example also illustrates the preparation of a composition capable of providing increased water absorption in bread dough, without simultaneous "dough bleaching." The special peroxidic composition of this example is characterized by good stability, the peroxidic content thereof being apparently chemically or physically attached to the dextrin in such manner as to be released only under the conditions of moisture and combined moisture and heat encountered in the bread dough. Thus, the peroxidic composition of this example is substantially free from readily volatilizable peroxidic material and can be stored under practical conditions.

*Example 6*

An initial liquid reaction mixture was prepared by blending equal volumes of acetone and aqueous hydrogen peroxide solution (30% $H_2O_2$). The resulting blend was aged at room temperature for 23 hours and 10 cc. thereof was then uniformly incorporated in 200 g. yellow corn flour. After storage in a closed container for 26 hours at room temperature, the resulting composition was heated in a closed system for 4 hours at 98° C. The resulting composition was strongly positive to potassium iodide and proved to be remarkably stable. Thus, the composition was still strongly positive to potassium iodide after (1) storage at room temperature for 18 days in open air, (2) additional heating for 3 hours in an oven at 102° C. in the presence of water vapor, and (3) an additional storage period of 50 days at room temperature in open air.

This example illustrates the preparation of a relatively stable composition in which the peroxidic reaction products are chemically or physically combined with a carrier in such manner as to be not readily volatilizable. On the other hand, the peroxidic products are released under the conditions of moisture and combined moisture and heat encountered in dough during the preparation of baked goods. As was the case with the composition described in Example 5, the peroxidic composition of the present example is capable of providing increased water absorption in bread doughs, without dough bleaching.

*Example 7*

An initial liquid reaction mixture was prepared by blending 68.0 cc. of aqueous hydrogen peroxide (36.75% $H_2O_2$) with 130 cc. of acetone and 1.4 cc. of 6.6% hydrochloric acid solution. Of this unaged liquid mixture, 90 cc. was added to and concentrated on 26 grams of powdered, food grade corn starch as follows: Over a period of 30 minutes, working in a mortar, six 5 cc. portions of the liquid were incorporated in the corn starch sequentially. The resulting pasty mass was dried in the open at room temperature for 16 hours, forming dry lumps which were easily broken up mechanically. An additional 40 cc. of the liquid acetone-hydrogen peroxide blend was then introduced step-by-step over a period of eight hours and the resulting composition then allowed to stand for two and a half days in the open at room temperature. At the end of this period, the composition was completely dry. The remaining 20 cc. of liquid was then worked into the dry material to produce a fondant-like mass which was dried at room temperature in the open for seven hours, and then, being only slightly damp, transferred to a closed container. At this time, the material titrated 151.0 grams hydrogen peroxide equivalent per 1000 grams. After 19 days' storage under refrigeration, this value was 152.6 grams per 1000 grams and, after 958 days' storage under refrigeration, this value was 118.76 grams per 1000 grams. The composition was characterized by a strong, active, horseradish-like odor characteristic of bis-(1,1'-hydroperoxy 1,1'-methyl) diethyl peroxide.

The relatively stable peroxidic composition of this example is diluted with any suitable edible, dry, particulate extender and employed as a dough-maturing agent in the preparation of bread and other baked goods. Thus, employed in preparation of white bread, the composition provides increased water absorption without adversely affecting loaf volume, more elastic and springy doughs, and improvement in the grain and texture of the finished bread.

The example illustrates one typical method for accomplishing reaction of the acetone and hydrogen peroxide directly on the corn starch or other carrier material, with in situ formation of bis-(1,1'-hydroperoxy 1,1'-methyl) diethyl peroxide and other peroxidic compounds to provide a relatively stable composition capable of releasing its peroxidic activity upon subjection to moisture and/or heat.

*Example 8*

An initial liquid mixture consisting of 57.07% acetone, 14.12% hydrogen peroxide, 28.75% water and 0.05% hydrochloric acid is prepared and aged at room temperature for 24 hours to provide a reaction product mixture containing in solution material proportions of bis-(1,1-hydroperoxy 1,1'-methyl) diethyl peroxide and other acyclic peroxidic products. Two cc. of this reaction product mixture is thoroughly worked into 17 g. dry, pure, commercial wheat gluten, providing a dry, crumbly mass. Such product is then stored in a closed container for 24 hours to allow uniform penetration of the liquid into the particles of the proteinaceous carrier without substantial loss of volatiles. The composition is then dried at room temperature in open air for 22 hours and then ground and sifted to provide a dry, finely particulate product from which the fraction remaining on an 80-mesh screen is recovered by sifting.

With the 24-hour old reaction product mixture titrating 13.6 g. hydrogen peroxide per 100 cc., the recovered fraction of the dry particulate composition titrates about 40 g. hydrogen peroxide per 1000 g. The recovered dry particulate composition is blended with an amount of dry gluten flour, as an extender, to provide the desired peroxide concentration, and the composition is then ready for inclusion in bread dough as an effective bread improver.

This example illustrates the preparation of novel peroxidic compositions, in accordance with the invention, employing wheat gluten as the carrier, the resulting composition comprising case-hardened proteinaceous particles with the peroxidic reaction products carried within the particle. Since, in each such particle, the peroxidic reaction products are confined largely within the hard "skin" of the particle, loss of peroxidic activity by volatilization is inhibited and stability of the product enhanced. Employed in production of white bread, for example, such compositions give increased water absorption, doughs which are more lively and springy, and improved grain and texture in the baked loaves.

*Example 9*

An initial liquid mixture of 57.07% acetone, 14.12% hydrogen peroxide, 28.75% water and 0.05% hydrochloric acid is prepared and aged at room temperature for 24 hours to provide a reaction product mixture containing in solution material proportions of bis-(1,1'-hydroperoxy 1,1'-methyl) diethyl peroxide and other acyclic peroxidic products. Two cc. of this liquid reaction product mixture is thoroughly worked onto 17 g. dry, pure, commercial wheat gluten, providing a dry, crumbly mass. Such product is then stored in a closed container for 24 hours to allow uniform penetration of the liquid into the particles of the proteinaceous carrier. The composition is then dried at room temperature in open air for 22 hours and ground and classified to provide a particulate product as least predominantly 40–60 mesh. This product is then heated at 100° C. for 70 minutes without addition of moisture, providing a stabilized periodic composition in which the peroxide reaction products are confined within the case-hardened particles of gluten. This product is then mixed with any suitable edible, particulate extender to provide a bread improver composition having the desired peroxide content.

Employed in the production of white bread by conventional procedures, such as the sponge-dough procedure of Example 1, compositions prepared in accordance with this example provide increased water absorption, better doughs, and improved grain and texture of the baked loaves.

Example 10

Equal parts by volume of acetone and aqueous hydrogen peroxide solution (30% $H_2O_2$) are blended and the resulting liquid mixture aged at room temperature for 23 hours. Thirty-five cc. of the resulting reaction product mixture is then blended uniformly with 1000 g. of dry, finely particulate, essentially pure, non-heat-denatured soybean protein. The resulting composition is stored in a closed container for 36 hours at room temperature to allow penetration of the liquid reaction product mixture into the protein particles. The composition is then dried in open air at room temperature for 22 hours and heated for 2 hours at approximately 100° C. to provide a relatively stable product in which the peroxidic reaction products, including material proportions of bis-(1,1'-hydroperoxy 1,1'-methyl) diethyl peroxide and other acyclic acetone peroxides, are confined within case-hardened particles of soybean protein. This product is then mixed with any suitable edible, particulate extender to provide a bread improver composition of the desired peroxide content.

Employed in bread doughs prepared by the sponge-dough procedure of Example 1, for example, in proportions providing a hydrogen peroxide equivalent content equal to 0.001–0.002% of the weight of flour employed, such composition provides increased water absorption in the dough, better doughs, and a marked improvement in grain and texture of the baked loaves.

I claim:

1. The method for producing yeast-leavened baked goods comprising preparing a dough by combining with flour and other dough-forming ingredients a peroxidic composition comprising an acetone-hydrogen peroxide reaction product mixture which is substantially free from crystallized cyclic acetone peroxide polymers and contains a substantial titratable peroxide content other than free hydrogen peroxide, a material proportion of said titratable peroxide content being bis-(1,1'-hydroperoxy 1,1'-methyl) diethyl peroxide, said titratable peroxide content providing a hydrogen peroxide equivalent value equal to from about one thousandth of a percent to several thousandths of a percent of the weight of the flour.

2. The method for producing yeast-leavened baked goods comprising preparing a dough by combining with flour and other dough-forming ingredients a peroxidic composition comprising an acetone-hydrogen peroxide reaction product mixture intimately combined with an edible, solid, particulate carrier, mixing the dough so formed, and baking the dough, said peroxide composition being substantially free from crystallized cyclic acetone peroxide polymers and having a substantial titratable peroxide content other than free hydrogen peroxide, a material proportion of said titratable peroxide content being bis-(1,1'-hydroperoxy 1,1'-methyl) diethyl peroxide, said titratable peroxide content providing a hydrogen peroxide equivalent value equal to from about one thousandth of a percent to several thousandths of a percent of the weight of the flour.

3. The method of claim 2 wherein said carrier is a starchy cereal product.

4. The method of claim 2 wherein said carrier is corn starch.

5. The method of claim 2 wherein said carrier is a particulate proteinaceous vegetable material and said reaction product mixture is retained within the particles of said proteinaceous material.

6. The method for preparing yeast-leavened baked goods comprising preparing a dough by combining with flour and other dough-forming ingredients a peroxidic composition comprising an acetone-hydrogen peroxide reaction product mixture intimately combined with an edible, solid, particulate carrier, mixing the dough, and baking the dough so prepared, said peroxidic composition comprising as its primary oxidatively active components a plurality of hydroperoxidic compounds derived from acetone and containing not more than 3 acetone groups, one such active component being bis-(1,1'-hydroperoxy 1,1'-methyl) diethyl peroxide, said peroxidic composition being employed in an amount providing a hydrogen peroxide equivalent value equal to from about one thousandth of a percent to several thousandths of a percent of the weight of the flour.

7. The method of claim 6 wherein said carrier is a starchy cereal product.

8. The method of claim 6 wherein said carrier is corn starch.

9. The method of claim 6 wherein said carrier is a particulate proteinaceous vegetable material and said reaction product mixture is retained within the particles of said proteinaceous material.

References Cited in the file of this patent

UNITED STATES PATENTS

| 1,483,546 | Gelissen | Feb. 12, 1924 |
| 1,866,412 | Van der Lee | July 5, 1932 |
| 2,903,361 | Marks et al. | Sept. 8, 1959 |

OTHER REFERENCES

"Organic Peroxides, Their Chemistry, Decomposition and Role in Polymerization," 1954, by Tobolsky et al., Interscience Publishers, Inc. (New York), page 45.

UNITED STATES PATENT OFFICE
CERTIFICATE OF CORRECTION

Patent No. 3,084,048                                          April 2, 1963

Herbert O. Renner

It is hereby certified that error appears in the above numbered patent requiring correction and that the said Letters Patent should read as corrected below.

Column 4, line 71, for "releasintg" read -- releasing --; column 7, line 29, for "pocedure" read -- procedure --; column 11, line 5, for "periodic" read -- peroxidic --; column 12, line 7, for "peroxide" read -- peroxidic --.

Signed and sealed this 29th day of October 1963.

(SEAL)
Attest:

ERNEST W. SWIDER                                    EDWIN L. REYNOLDS

Attesting Officer                               Acting Commissioner of Patents